(12) United States Patent
Monaghan (10) Patent No.: US 11,758,104 B1
(45) Date of Patent: Sep. 12, 2023

(54) SYSTEMS AND METHODS FOR PREDICTIVE STREAMING OF IMAGE DATA FOR SPATIAL COMPUTING

(71) Applicant: Illuscio, Inc., Culver City, CA (US)

(72) Inventor: Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/047,381

(22) Filed: Oct. 18, 2022

(51) Int. Cl.
*H04N 13/117* (2018.01)
*G06T 15/20* (2011.01)
*H04N 13/354* (2018.01)
*H04L 51/046* (2022.01)
*G06T 7/194* (2017.01)

(52) U.S. Cl.
CPC ........... *H04N 13/117* (2018.05); *G06T 7/194* (2017.01); *G06T 15/20* (2013.01); *H04L 51/046* (2013.01); *H04N 13/354* (2018.05)

(58) Field of Classification Search
None
See application file for complete search history.

(56) References Cited

U.S. PATENT DOCUMENTS

| | | | |
|---|---|---|---|
| 2008/0260269 A1* | 10/2008 | Thiagarajan | H03M 7/30 375/E7.184 |
| 2014/0282681 A1* | 9/2014 | Carney | H04N 21/4542 725/75 |
| 2015/0324858 A1* | 11/2015 | DeMattei | G06Q 30/0267 705/14.64 |
| 2016/0353146 A1* | 12/2016 | Weaver | H04N 21/2662 |
| 2018/0146212 A1* | 5/2018 | Hensler | H04N 1/646 |
| 2018/0160160 A1* | 6/2018 | Swaminathan | H04N 21/816 |
| 2020/0118301 A1* | 4/2020 | Connelly | G06T 19/20 |
| 2020/0154147 A1* | 5/2020 | Han | G06F 3/012 |
| 2021/0304706 A1* | 9/2021 | Petrangeli | G06F 16/487 |

* cited by examiner

*Primary Examiner* — Anh-Tuan V Nguyen
(74) *Attorney, Agent, or Firm* — Ansari Katiraei LLP; Arman Katiraei; Sadiq Ansari (57) ABSTRACT

Disclosed are systems and methods for the out-of-order predictive streaming of elements from a three-dimensional ("3D") image file so that a recipient device is able to produce a first visualization of at least a first streamed element from a particular perspective, similar to the instant transfer of two-dimensional ("2D") images, while the additional elements and perspectives of the 3D image are streamed. The sending device prioritizes the 3D image elements based on a predicted viewing order, streams a particular element from a particular perspective with a priority that is greater than a priority associated with other elements and other perspectives, determines a next element to stream after the particular element based on the next element being positioned adjacent to the particular element and having a priority that is greater than adjacent elements, and streams the next element to the recipient device.

20 Claims, 9 Drawing Sheets

SYSTEMS AND METHODS FOR PREDICTIVE STREAMING OF IMAGE DATA FOR SPATIAL COMPUTING

BACKGROUND

Point clouds represent highly detailed and accurate three-dimensional ("3D") models or images of an object or scene. The point cloud files and/or other 3D files are orders of magnitude larger in size than two-dimensional ("2D") images of the same object or scene.

As devices evolve with more complex sensors, better hardware, and more computing power, there is an expected transition from taking 2D images to taking 3D images, and a desire to instantly share those 3D images with friends and family over a data network. Even with the proliferation of Fifth Generation ("5G") wireless data networks, it may take several seconds if not minutes to send the 3D image data from one device to another. It may take an additional few seconds to process and/or render the 3D image data before presenting the 3D image. These delays are an obstacle to the widespread adoption of point clouds, 3D images, and/or other image formats that result in large files.

DETAILED DESCRIPTION OF PREFERRED EMBODIMENTS

The following detailed description refers to the accompanying drawings. The same reference numbers in different drawings may identify the same or similar elements.

Provided are systems and methods for predictive streaming of three-dimensional ("3D") image data for spatial computing. The predictive streaming involves capturing, generating, or creating a 3D image of an object or scene, dynamically determining the elements within the object or scene and/or viewing perspectives of those elements that are of most interest to a recipient and/or that are expected to be viewed first by the recipient, prioritizing the data within the 3D image based on the dynamic determination of elements and/or viewing perspectives, and streaming the 3D image data out-of-order to a recipient device of the recipient based on the element and/or viewing perspective prioritization.

In some embodiments, the out-of-order streaming includes transmitting a dynamically selected data set that does not include the first byte, first primitive, or other first data encoded as part of the 3D image file. Instead, the dynamically selected data set that is first transmitted to the recipient device includes the points, polygons, meshes, and/or primitives that form the highest priority element from the highest priority viewing perspective. In other words, the sending device selectively streams the part of the image (e.g., the highest priority element) that is determined to be of most interest to the viewer or that the viewer is predicted to focus on first before streaming other parts of the image or the same part from different 3D perspectives. The out-of-order streaming further includes streaming other non-sequential data sets from the 3D image file that represent the element of next most interest to the viewer or the element that the viewer is most likely to transition to and view after viewing the first presented element. In other words, the second data set that is streamed after the initial dynamically selected data set does not include the bytes, primitives, or other data that are encoded after the initial dynamically selected data set in the 3D image file.

The recipient device receives the initial dynamically selected data set that is streamed from the sending device. The recipient device immediately produces a first visualization of the represented element in the 3D image from the preferred viewing perspective. The sending device continues predictively streaming other parts or data sets of the 3D image that the recipient device is expected to access after the element represented by the initial dynamically selected data set so that the other parts or data sets of the 3D image are locally available for rendering on the recipient device in response to user interactions that transition away from the first visualization to view the other parts of the 3D image.

In this manner, the recipient device is not left waiting for the entire 3D image file to download before generating a visualization of part or all of the represented object or scene. Instead, the recipient device presents the first visualization of the 3D image file in a similar time frame as when receiving and presenting a much smaller two-dimensional ("2D") image file since the first visualization is from a particular viewing perspective that is a 2D view of the dynamically selected element. In other words, the predictive streaming prioritizes presenting a 2D image from the 3D image file that the viewer is likely to view first or focus on while streaming the remainder of the data that transforms the presented 2D image into a 3D image. The viewer is unaware that the full 3D file has not been downloaded since the 2D display of the recipient device is presenting a 2D view of the 3D image based on the rendering of the dynamically selected data set. By the time the viewer views the first visualization and provides input to transition away from the first visualization to a different element of the 3D image or to a different perspective of the initially presented element, the predictive streaming will have streamed the corresponding data sets to the recipient device for presentation allowing the viewer to then benefit from the additional features, image detail, and perspectives of the 3D image.

Accordingly, the predictive streaming improves image sharing services and/or real-time communication services by creating the same user experience for the sharing 3D images as there is for the sharing of 2D images. The predictive streaming allows a 3D image to be shared and viewed in the same time frame as the sharing and viewing of a 2D image, and improves on the overall user experience by enhancing the shared images with the additional rich features, interactivity, detail, dimension, and/or other qualities that the 3D images offer and that the 2D images lack.

In some embodiments, the predictive streaming is customized based on bidirectional communication between the recipient device and the sending device during the streaming of image date. For instance, the sending device determines a first set of priorities for the different parts of the 3D image, and begins streaming the 3D image data according to the first set of priorities. The recipient device tracks and sends user interactions with the 3D image to the sending device, and the sending device changes from the first set of priorities to a second set of priorities that more closely matches the expected viewing of the 3D image on the recipient device. The sending device modifies the order in which it streams the remaining parts of the 3D image to the recipient device according to the second set of priorities.

Figure 1:
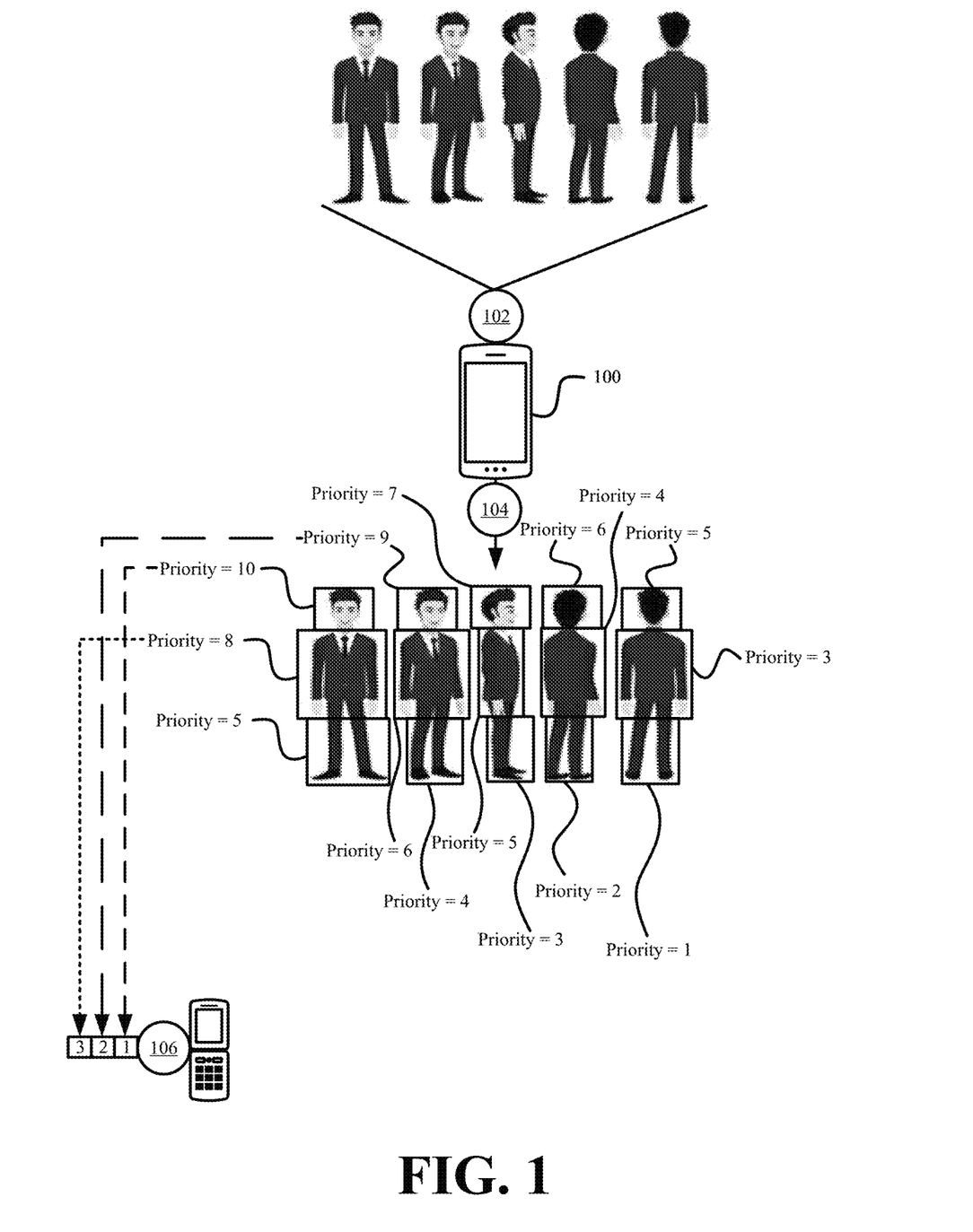
FIG. 1 illustrates an example of predictive streaming in accordance with some embodiments presented herein.

FIG. 1 illustrates an example of the predictive streaming in accordance with some embodiments presented herein. Sending device 100 obtains (at 102) a 3D image of a person. The 3D image may be generated using sensors of sending device 100. For instance, one or more sensors of sending device 100 scan or image the person from all sides.

In some embodiments, the one or more sensors include a camera or imaging sensor that captures 2D images of the person from different angles or positions, and a photogrammetry technique may be used to generate a 3D image of the person from the 2D images. In some embodiments, the one or more sensors include 3D or depth-sensing sensor, Light Detection and Ranging ("LiDAR") sensor, Magnetic Resonance Imaging ("MM") scanner, Positron Emission Tomography ("PET") scanner, Computerized Tomography ("CT") scanner, time-of-flight sensor, structured or patterned light imaging sensor, and/or other sensor that emits lasers, light, sound, and/or other signaling to accurately measure the position of each point on the person as well as intensity values associated with the detected point across different wavelengths or bands of the electromagnetic spectrum. In some such embodiments, one set of sensors may capture the depth or position of the person, and another set of sensors may capture the color or visual characteristics, and sending device 100 may combine the output from each set of sensors to generate the 3D image of the person. The data associated with the 3D image may include data points of a point cloud, polygons or meshes of another 3D image or 3D file format, or other primitives that are used to construct a 3D model of the person.

Sending device 100 analyzes the 3D image, and prioritizes (at 104) the 3D image elements and the different perspectives of the person in the 3D capture. The 3D image elements include the visual features, objects, colors, and/or other visual aspects of the 3D image.

Prioritizing (at 104) the elements includes performing an automated analysis to differentiate foreground elements from background elements, elements in focus from elements that are out of focus, central elements from elements in the periphery, elements with visual detail from elements that lack visual detail, and/or elements shown from different perspectives in the 3D image based on other criteria. In other words, prioritizing (at 104) the elements includes determining the relative importance of each element to a viewer, the different degree of interest of each element to a viewer, or the expected order that the viewer views or focuses on the different elements of the 3D image.

Prioritizing (at 104) the different perspectives includes determining the angle, perspective, and/or orientation that presents each element with the greatest visual acuity, most detail, and/or clearest view. As shown in FIG. 1, sending device 100 prioritizes (at 104) the person's head or face from a front view over side, back, top, and bottom views of the person's head or face, and/or from other elements of the person (e.g., arms, feet, back, etc.) from any of the views or different perspectives.

Sending device 100 streams (at 106) the 3D image data out-of-order according to the prioritization (at 104) of the different elements and perspectives. For instance, sending device 100 streams (at 106) a first byte range or first subset of image data from the 3D image that represents the person's face from the front view, followed by a second byte range or second subset of image data from the 3D image that represents the person's face offset from the front by 25 degrees, and followed by a third byte range or third subset of image data from the 3D image that represents the person's torso from the front view. The first, second, and third byte ranges correspond to different sets of data points in different locations within a point cloud, or different non-consecutive byte ranges from a file that encodes the entirety of the 3D image (e.g., all data that was captured of the person from the different angles or perspectives), wherein the different non-consecutive byte ranges do not include the first byte or the last byte of the encoding or 3D file storing the entirety of the 3D image data.

Figure 2:
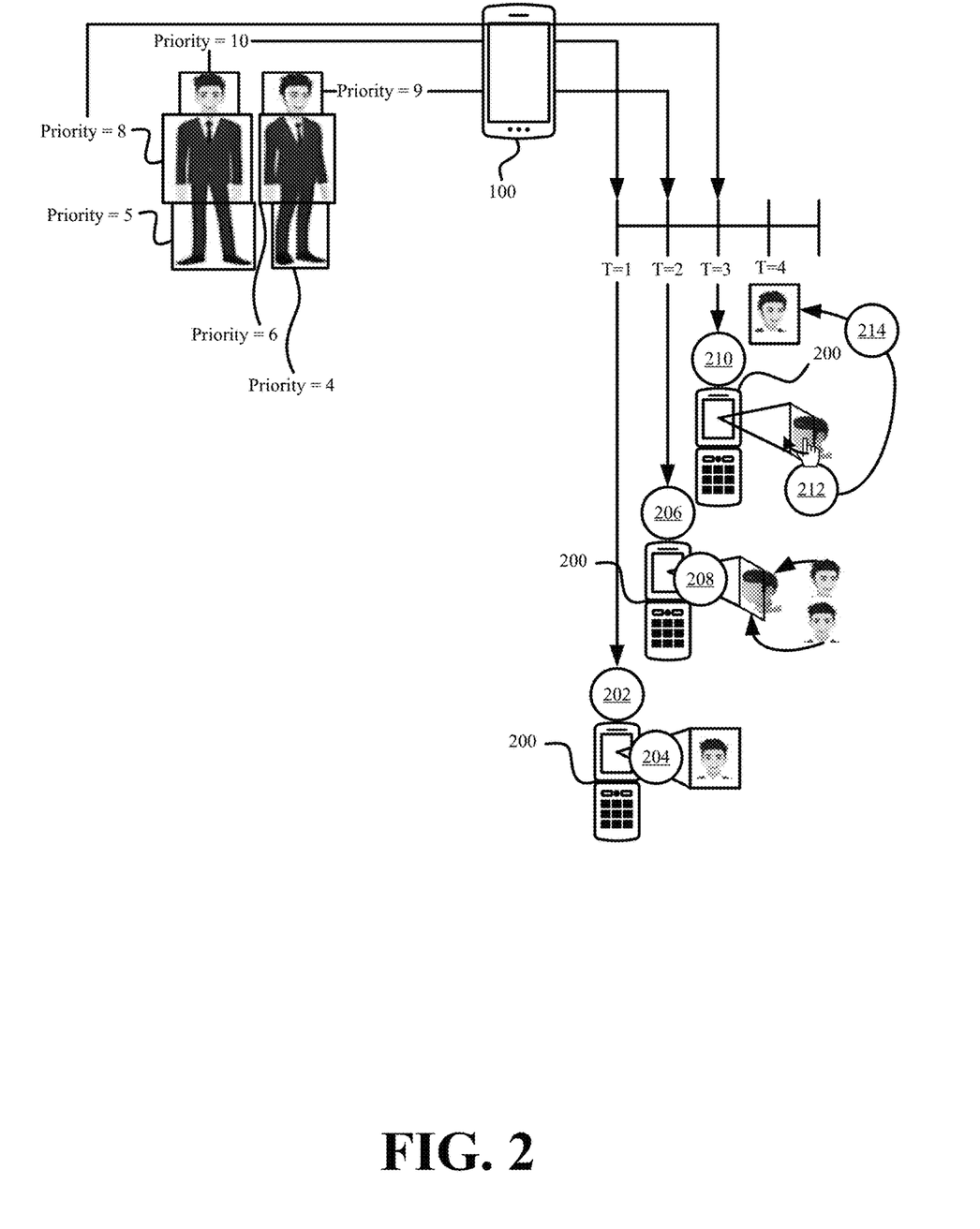
FIG. 2 illustrates an example of a recipient device generating an instantaneous visualization of a three-dimensional ("3D") image in response to the streaming of the 3D image data in accordance with some embodiments presented herein.

FIG. 2 illustrates an example of recipient device 200 generating an instantaneous visualization of the 3D image in response to the streaming of the 3D image data in accordance with some embodiments presented herein. Sending device 100 streams (at 202) the prioritized first byte range or first subset of the 3D image data to recipient device 200. Recipient device 200 receives (at 202) the prioritized first byte range or first subset of the 3D image data, and generates (at 204) a first visualization of the 3D image data based on the prioritized first byte range or first subset of the 3D image data without waiting for the remainder of the 3D image data to arrive.

The first visualization that is generated (at 204) from the prioritized first byte range or first subset of the 3D image data is a front view of the person's face or head. Sending device 100 has determined that the front perspective of the person's face or head is the most important or first element from the full 3D image that the recipient is likely to focus on and want to see. Accordingly, the prioritized first byte range or first subset of the 3D image data provides a focused or zoomed in view of the entire 3D image from a particular perspective.

Recipient device 200 generates (at 204) the first visualization at a first time that corresponds to the time the first byte range or first subset of the 3D image data is received (at 202) by recipient device. The first byte range or the first subset of the 3D image data is a fraction of the overall data making up the entire 3D image. In some embodiments, the first byte range or the first subset of the 3D image data is effectively a 2D image of the person's face. Recipient device 200 therefore receives (at 202) the data for the first visualization of the 3D image in about the same time as a 2D image, and generates (at 204) the first visualization of the 3D image in about the same time as a 2D image so that the user experience for sharing and viewing the 3D image is no different than sharing and viewing 2D images despite the additional views, detail, dimensions, and/or other visual qualities that are contained within the 3D image and that are absent or lacking in the 2D images.

The viewer is unaware that the entire 3D image has not been downloaded or that the additional views, details, dimensions, and/or other visual qualities of the 3D image are not available at the first time. The predictive streaming produces the first visualization so that the viewer has a visualization of the 3D image to view while other views, details, dimensions, and/or other visual qualities corresponding to other parts of the 3D image are selectively and intelligently streamed to recipient device 200.

While presenting the first visualization between the first time and a second time, recipient device 200 receives (at 206) a second byte range or second subset of the 3D image data. Sending device 100 determines, based on the prioritization, that the viewer is likely to view the element represented by the second byte range or second subset of the 3D image data after the first visualization. As shown in FIG. 2, the second byte range or the second subset of the 3D image data includes an angled view of the person's face that adds dimensionality, details, and/or other visual qualities to the person's face that are not present from just the front view of the first visualization. For instance, sending device 100 may determine that for 80% of 3D images showing a front view of a person's face, the viewer changes the visualization to view the person's face from the angled view represented by the second byte range or the second subset of the 3D image data.

Recipient device 200 updates (at 208) the first visualization with the second byte range or the second subset of the 3D image data. In some embodiments, updating (at 208) the first visualization includes buffering or storing the second byte range or the second subset of the 3D image data until the viewer provides input to change from the first visualization to a second visualization represented by the second byte range or the second subset of the 3D image. In some embodiments, updating (at 208) the first visualization includes generating a second visualization that adds or incorporates the element represented by the second byte range or the second subset of the 3D image data to the element that is presented in the first visualization. In other words, recipient device 200 begins to construct the 3D image from the streamed in parts or subsets of image data. In some such embodiments, recipient device 200 continues to display the first visualization (e.g., the front view of the person's view) while rendering the angled view of the person's view in the background.

Recipient device 200 continues receiving (at 210) additional byte ranges or subsets of 3D image data for other parts of the person that sending device 100 has prioritized or determined to be viewed after the front view and first angled view of the person's face. Once the viewer provides (at 212) input to transition away from the first visualization, recipient device 200 presents (at 214) a new visualization based on the subsequently streamed image data for the new field-of-view.

Figure 3:
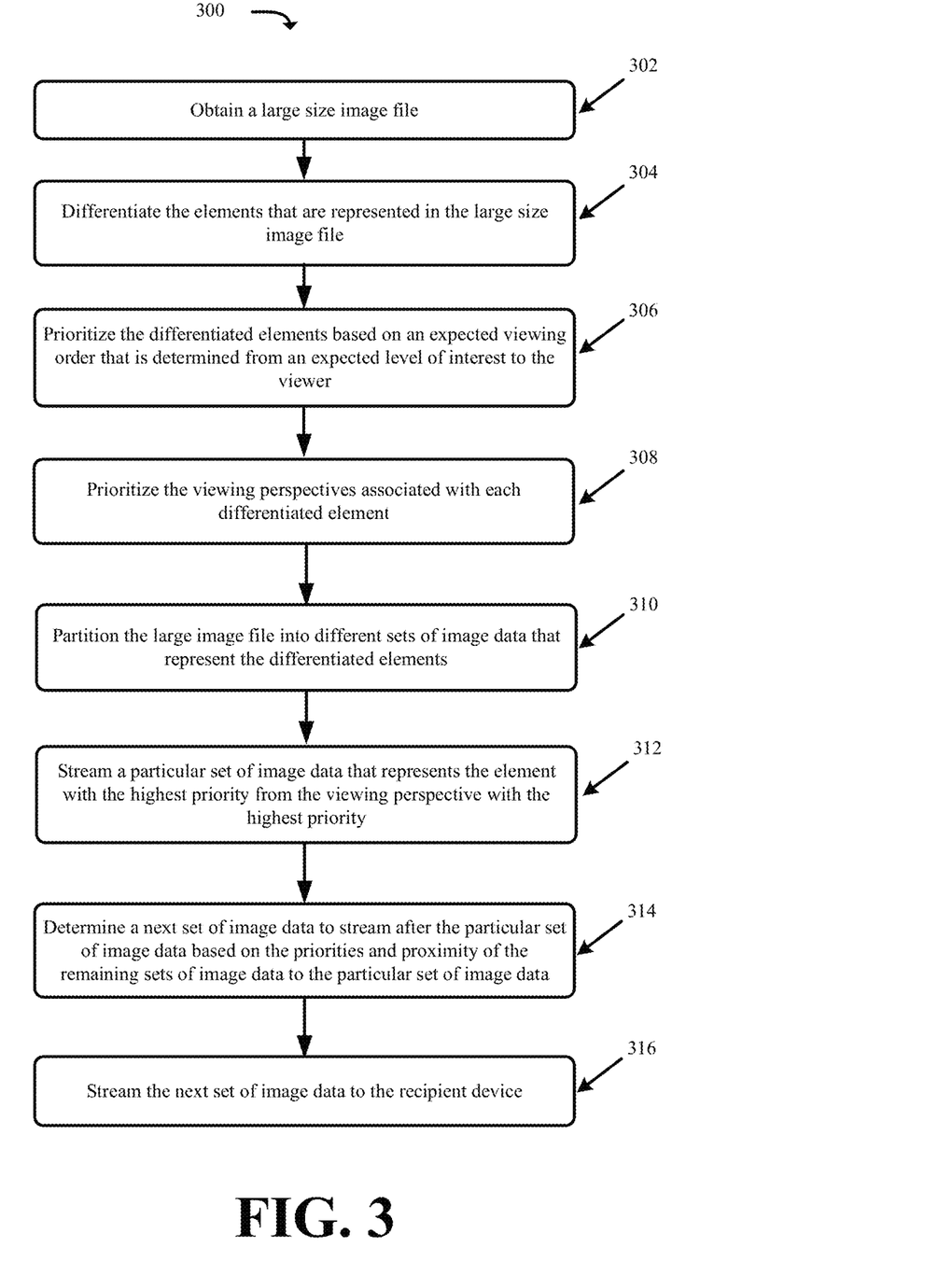
FIG. 3 presents a process for the predictive streaming of 3D image data in accordance with some embodiments presented herein.

FIG. 3 presents a process 300 for the predictive streaming of 3D image data in accordance with some embodiments presented herein. Process 300 is implemented by sending device 100, or by an intermediary streaming device that facilitates communications and/or content sharing between sending device 100 and recipient device 200. Sending device 100 includes a network-connected device such as a smartphone device, a tablet device, a laptop computer, and/or other computing devices that communicate with one or more recipient devices over a telecommunications or data network.

Process 300 includes obtaining (at 302) a large size image file. In some embodiments, sending device 100 includes one or more sensors for capturing, imaging, or otherwise generating the image data encoded within the large size image file. The large size image file includes a high resolution 2D image or any of several 3D image file formats (e.g., a point cloud, a mesh or polygon based 3D model, etc.) with a file size that exceeds a size threshold (e.g., greater than 50 megabytes). In some embodiments, the sending device obtains (at 302) the large size image file in response to a user attaching or otherwise linking the large size image as part of a text message, instant message, email, chat message, or other message associated with a real-time communication service or limited bandwidth communication service.

Process 300 includes differentiating (at 304) the elements that are represented in the large size image file. Differentiating (at 304) the elements includes partitioning a 2D or 3D image into different parts or regions of varying interest.

In some embodiments, each differentiated element may correspond to a 2D plane that represents a 3D scene or image from a different angle or perspective (e.g., front, side, back, top, bottom, various perspective or offset angles, etc.). In some other embodiments, differentiating (at 304) the elements includes performing object recognition to detect unique forms, objects, and/or other structures within the large size image and/or different perspectives at which the same forms, objects, and/or other structure are represented. For instance, an image of a person may be partitioned into different elements for the head, torso, and lower body, and an image of a car may be partitioned into different elements for the hood or front, sides, and trunk.

Process 300 includes prioritizing (at 306) the differentiated elements based on an expected viewing order that is determined from an expected level of interest to the viewer. For instance, sending device 100 prioritizes foreground elements over background elements, elements in focus over elements that are out of focus, central elements over element in the periphery, elements with visual detail over elements that lack visual detail, and/or elements with a first set of classifications over elements with a different second set of classifications.

Prioritizing (at 306) the elements further include ranking or scoring the differentiated elements based on the expected level of interest to the viewer. In some embodiments, artificial intelligence and/or machine learning ("AI/ML") techniques are used to determine the expected viewing order or level of interest importance of different elements appearing in different images. For instance, the AI/ML techniques may run on the recipient devices, and may track what elements within a presented image are focused on or viewed first by the viewer. In some embodiments, the AI/ML techniques may use cameras of the recipient devices or eye-tracking sensors to determine which element in a presented image the viewer focuses on, views first or spends the most time viewing. In some other embodiments, the AI/ML techniques track zoom behavior to identify the elements in an image that are of most interest or relevance to a viewer. The AI/ML techniques may aggregate the data that is tracked from the different recipient devices in order to generate one or more models for ranking the interest level or importance of different elements relative to one another and/or to different viewers, and for deriving the expected viewing order based on the rankings.

For 3D image data, the AI/ML techniques may monitor and determine the preferred viewing perspective for different elements, wherein the preferred viewing perspective is determined by rotations and manipulations made by the viewer, and tracking the time that a viewer spends viewing different elements from different angles or perspectives. In some embodiments, the viewing time may be tracked relative to front, back, left, right, top, and bottom perspectives. In some other embodiments, the viewing time may be tracked relative to different viewing angles. For instance, the AI/ML techniques may track that a human face is observed from a front view 75% of the time, 15% of the time from an angled side view, and 10% from a full side view in different 3D images that include a human face, and may generate models that prioritize the front view of the human face over the angled side, and the full side view.

Accordingly, process 300 includes prioritizing (at 308) the viewing perspectives associated with each element. Prioritizing (at 308) the viewing perspectives includes determining the perspective with which each element is most frequently or most commonly viewed.

Process 300 includes partitioning (at 310) the large image file into different sets of image data that represent the differentiated elements. For instance, partitioning (at 310) the large image file includes selecting and/or extracting the data sets for the differentiated elements from the large image file. For instance, sending device 100 may select and/or extract a first set of image data that represents a first prioritized element from a first viewing perspective (e.g., front), a second set of image data that represents a second prioritized element from a second viewing perspective (e.g., left), a third set of image data that represents a second prioritized element from a third viewing perspective (e.g., a first angle and orientation), and a fourth set of image data that represents the second prioritized element from a fourth viewing perspective (e.g., a second angle and orientation). Accordingly, the sending device 100 partitions (at 310) the large image file into several smaller files that reconstruct the entire object or scene of the large image file when rendered and combined together.

Process 300 includes streaming (at 312) a particular set of image data that represents the element with the highest priority from the viewing perspective with the highest priority. Accordingly, streaming (at 312) the particular set of image data includes distributing or transmitting a set of bytes, data points, polygons, meshes, and/or other primitives that represent the highest priority element from the highest priority viewing perspective before streaming the byte, data point, polygon, mesh, and/or other primitive that is encoded first in the large image file. In other words, streaming (at 312) the particular set of image data includes performing an out-of-order and non-sequential sending of data from the large image file to the recipient device and an out-of-order and non-sequential sending of different parts, regions, or elements of the represented object or scene to the recipient device.

Process 300 includes determining (at 314) a next set of image data to stream after the particular set of image data based on the priorities and proximity of the remaining sets of image data to the particular set of image data. The next set of image data either includes a set of image data that neighbors the particular set of image data from one side and that is presented from the same perspective as the particular set of image, or the particular set of image data from a different viewing perspective. In other words, when the element represented by the particular set of image data is presented first, the viewer is most likely going to perform a gradual transition away from the presented element to a neighboring element or change the viewing perspective of the presented element, rather than abruptly transition from the element represented by the particular set of image data to an element at an entirely different location in the image. Consequently, the next set of image data does not necessarily represent the element with the next highest priority anywhere in the large size image, but the element with the next highest priority that is connected or associated with the element already streamed to the recipient device.

Process 300 includes streaming (at 316) the next set of image data to the recipient device. Process 300 continues selecting additional sets of image data to stream to the recipient device based on the next highest priorities and proximity or association with previously streamed sets of image data until all partitioned (at 310) sets of image data have been sent to the recipient.

Figure 4:
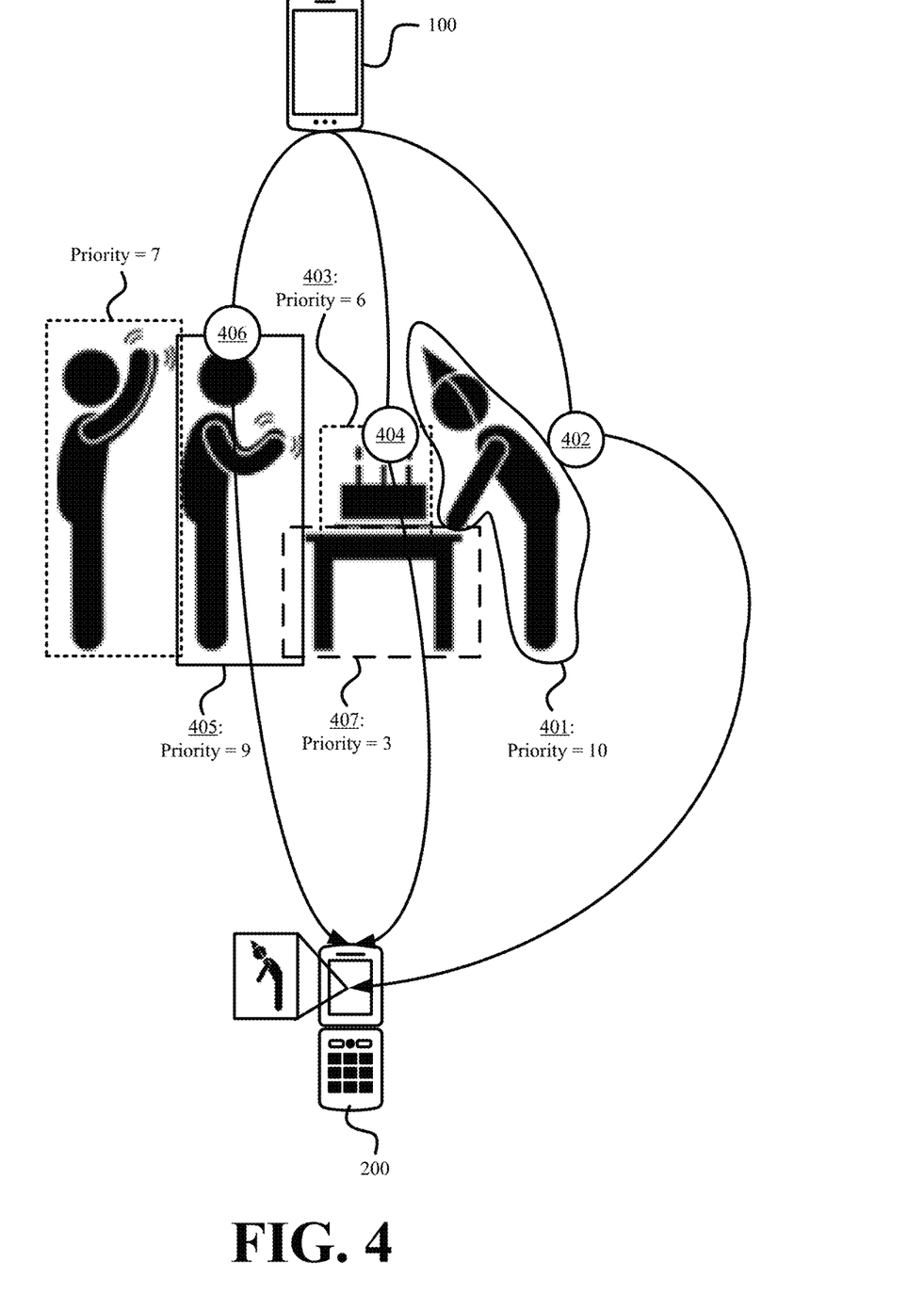
FIG. 4 illustrates an example of the out-of-order and non-sequential streaming of image element based on the priorities associated with the image elements in accordance with some embodiments presented herein.

FIG. 4 illustrates an example of the out-of-order and non-sequential streaming of image element based on the priorities associated with the image elements in accordance with some embodiments presented herein. FIG. 4 illustrates the priorities that are assigned to different elements in an image. For purposes of simplicity, a single priority is shown with respect to each partitioned element. However, different priorities may be assigned to different viewing perspectives of the same element in a 3D image. For instance, the same element may have a first priority associated with a front view, a second priority associated with a side view, and a third priority associated with a top view.

Sending device 100 selects first element 401 at a particular viewing perspective that has the highest priority to stream (at 402) first to recipient device 200. When two or more elements are associated with the same priority, sending device 100 may select between the elements based on a secondary classification of the elements. For instance, sending device 100 may select an element representing a human face over an element representing an animal or inanimate object, or sending device 100 may select an element representing a baby over an element representing an adult. In some other embodiments, sending device 100 may select and stream the data associated with each of the elements having the same priority.

Recipient device 200 renders and generates a first visualization based on the streamed data of first element 401. The first visualization presents the part of the overall image that sending device 100 has determined to be of most interest or important to the viewer so that the viewer is not left waiting for all other data of the image to be streamed from sending device 100 to recipient device 200. Moreover, the first visualization retains the viewer's focus for one or more seconds as the viewer inspects the first visualization, and it takes an additional one or more seconds for the viewer to provide input to transition away or off the first visualization. For instance, the input may include a pinch-to-zoom gesture, other touch input, mouse input, keyboard input, and/or other interaction that the viewer has with recipient device 200 that causes the transition away or off of the first visualization.

During these few seconds, sending device 100 selects second element 403 that is next to or touches first element 401 to stream after first element 401 despite second element 403 having a lower priority than third element 405. Sending device 100 determines that second element 403 is closer to first element 401 than third element 405, and as a result, a viewer is more likely to transition from the first visualization of first element 401 to a visualization of second element 403 when zooming out, rotating, or moving the field-of-view away from the first visualization of first element 401.

Accordingly, sending device 100 does not select third element 405 with the second highest priority to stream after first element 401, and instead streams (at 404) second element 403 with a lower priority but closer positioning to first element 401. In this manner, sending device 100 streams the data for elements that expand the image rather than elements at different disconnected parts or region of the image. During the few seconds that the viewer inspects the first visualization and/or provides input to transition away from the first visualization, recipient device 200 will have received the data for second element 403, and will therefore be able to render the second visualization for the adjacent second element 403 without delay and/or without waiting for recipient device 200 to download the entirety of the image.

Sending device 100 then searches for elements that are closest or connected to the previously streamed first element 401 and 403 as a next element to stream to a recipient device. Sending device 100 determines that third element 405 and fourth element 407 are closest or connected to the previously streamed elements 401 and 403, and streams (at 406) third element 405 over fourth element 407 to recipient device 200 based on the greater priority associated with third element 405 than fourth element 407. In other words, sending device 100 determines that the viewer is more likely to transition to or focus on third element 405 than fourth element 407 after either the first visualization and the second visualization based on their respective priorities and proximity to the previously streamed elements 401 and 403.

In some embodiments, the recipient device automatically transitions the visualization on recipient device 200 from a first streamed element to a second streamed element as the data for the different elements is received by recipient device 200. In some such embodiments, recipient device 200 creates an animation effect or a zoom out effect in which the scope or focus of the image automatically expands from the first element, that is determined to be of most interest to the viewer, to other surrounding elements of interest based on the priority, that determines the interest level or expected view order, of the surrounding element. This manner of presenting the highest priority element first and then expanding away to the surrounding elements provides sending device 100 and recipient device 200 the time needed to stream the large amounts of image data while occupying the attention of the viewer and hiding the fact that the entirety of the image was not downloaded when the first visualization was presented.

Figure 5:
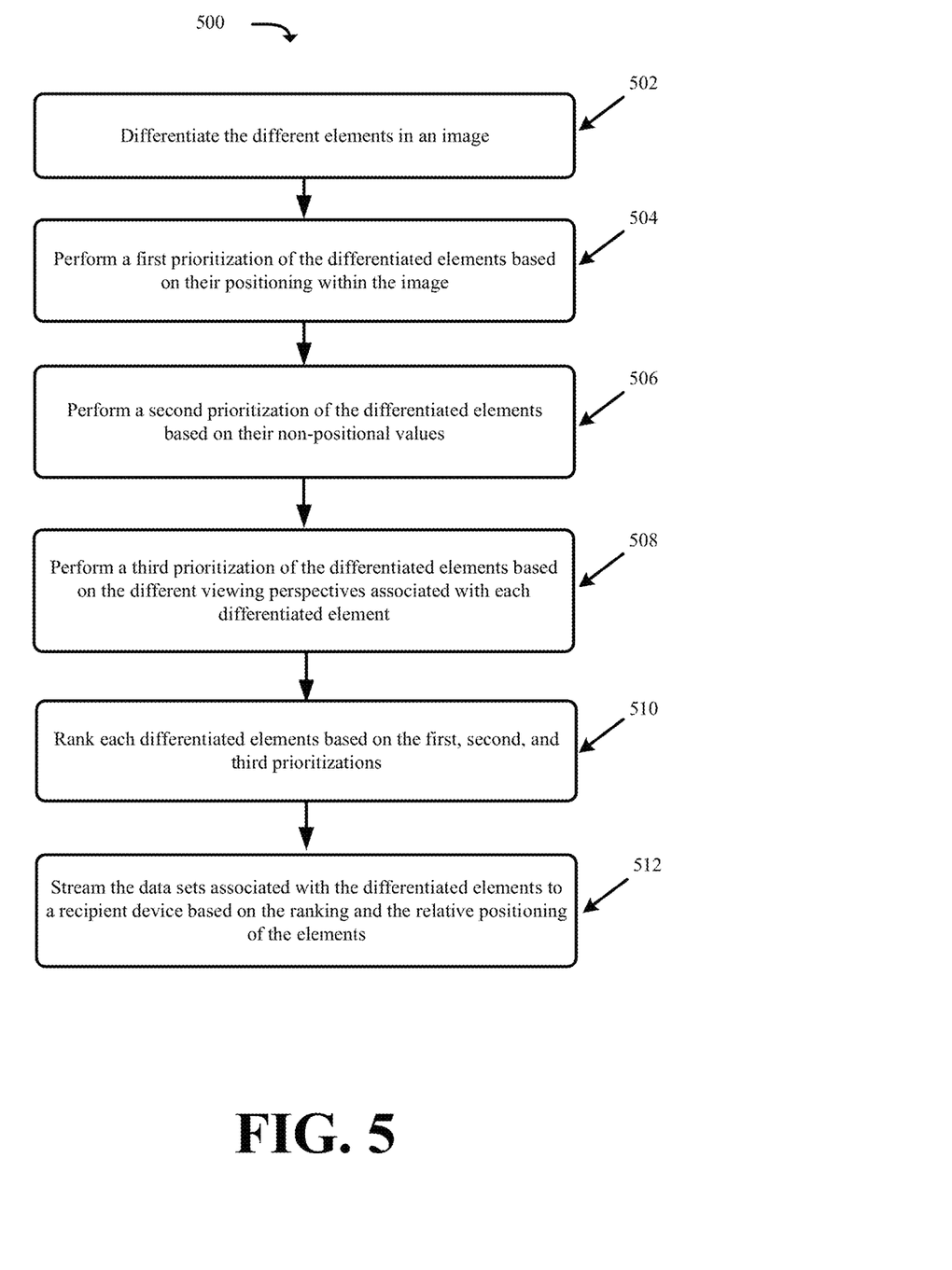
FIG. 5 presents a process for the prioritization of different elements in an image in accordance with some embodiments presented herein.

FIG. 5 presents a process 500 for the prioritization of different elements in an image in accordance with some embodiments presented herein. Process 500 is performed by sending device 100 that streams the different elements of the image in an out-of-order manner to recipient device 200, or by the intermediary streaming device that facilitates communications and/or content sharing between sending device 100 and recipient device 200.

Process 500 includes differentiating (at 502) the different elements in the image. In some embodiments, differentiating (at 502) the different elements includes performing object recognition to delineate the boundaries of distinct persons or objects in the image. In some other embodiments, differentiating (at 502) the different elements includes partitioning a 3D image into multiple 2D images that capture the 3D objects or 3D scene encoded in the 3D image from different angles, perspectives, or positions.

Process 500 includes performing (at 504) a first prioritization of the differentiated elements based on their positioning within the image. Sending device 100 or the intermediary streaming device obtains the positional coordinates (e.g., x, y, and z positional values) for the points, polygons, meshes, and/or other primitives that make up each differentiated element, uses the positional coordinates to classify the differentiated elements as a foreground or background element, as a central or periphery element, as a large or small element within the image, and/or as an in-focus or out-of-focus element, and associates a score or prioritization based on the classification. For instance, sending device 100 associates a lower prioritization to background elements than to foreground elements, a lower prioritization to periphery elements than central elements, a lower prioritization to small elements than to larger elements, and a lower prioritization to out-of-focus elements than to in-focus elements. In some embodiments, the focal depth or focal length of the imaging device used to capture the image may be stored as metadata of the image file, and sending device 100 may use the focal depth or focal length of the imaging device along with the positional coordinates to determine the in-focus and out-of-focus elements.

Process 500 includes performing (at 506) a second prioritization of the differentiated elements based on their non-positional values. The non-positional values of the points, polygons, meshes, and/or other primitives that make up each differentiated element encode the visual and/or descriptive characteristics of each differentiated element. For instance, the non-positional values correspond to the color values, color variation, and/or detail across a differentiated element. In some embodiments, sending device 100 associates a higher prioritization to elements with more color variation and/or detail than to elements with less color variation and/or detail. For instance, an element representing a uniform object with muted colors is typically less interesting to look at than an element representing an object with bright, vibrant, and varying colors.

Process 500 includes performing (at 508) a third prioritization of the differentiated elements based on the different viewing perspectives associated with each differentiated element. To perform (at 508) the third prioritization, sending device 100 determines the front face of each differentiated element. Object recognition techniques may be used to identify the front face of a differentiated element based on the location of human or animal eyes, classification of specific shapes (e.g., a hood of a car, a front door of a building, etc.) within the differentiated elements, and/or other attributes. In some embodiments, the front face of a particular differentiated element may not be determined directly from the features of that particular differentiated element but may be determined from the front face and/or features of other surrounding differentiated elements. For instance, the image may consist of a group of people holding a uniformly shaped object. The sending device may determine the front face for the group of people based on the group of people facing a particular direction. The sending device may select the front face of the uniformly shaped object to be the opposite to the front face determined for the group of people. In other words, the front face of the uniformly shaped object is the side of the object that the group of people are facing.

In some embodiments, AI/ML techniques may be used to prioritize the different perspectives at which an element is represented in the image. For instance, the AI/ML, techniques may track different amounts of time that viewers spend viewing the same element or a related element in other images from different perspectives, and may base the prioritization of the different perspectives on the tracked amounts of time.

Process 500 includes ranking (at 510) each differentiated elements based on the first, second, and third prioritizations. Ranking (at 510) the differentiated elements includes associating a score or other value representing the overall priority to the data set (e.g., set of points, polygons, meshes, and/or other primitives) that forms each differentiated element. In some embodiments, the score is stored as metadata or as part of the non-positional values of the data set.

Process 500 includes streaming (at 512) the data sets associated with the differentiated elements to a recipient device based on the ranking (at 510) and the relative positioning of the data sets. Streaming (at 512) the data sets includes transmitting the data sets to the recipient device in a different order than how the data sets are stored in the image file.

In some embodiments, the streaming of the image data is performed directly between the sending device and the recipient device. In some other embodiments, the streaming of the image data is performed through the intermediary streaming device of a communication system.

Figure 6:
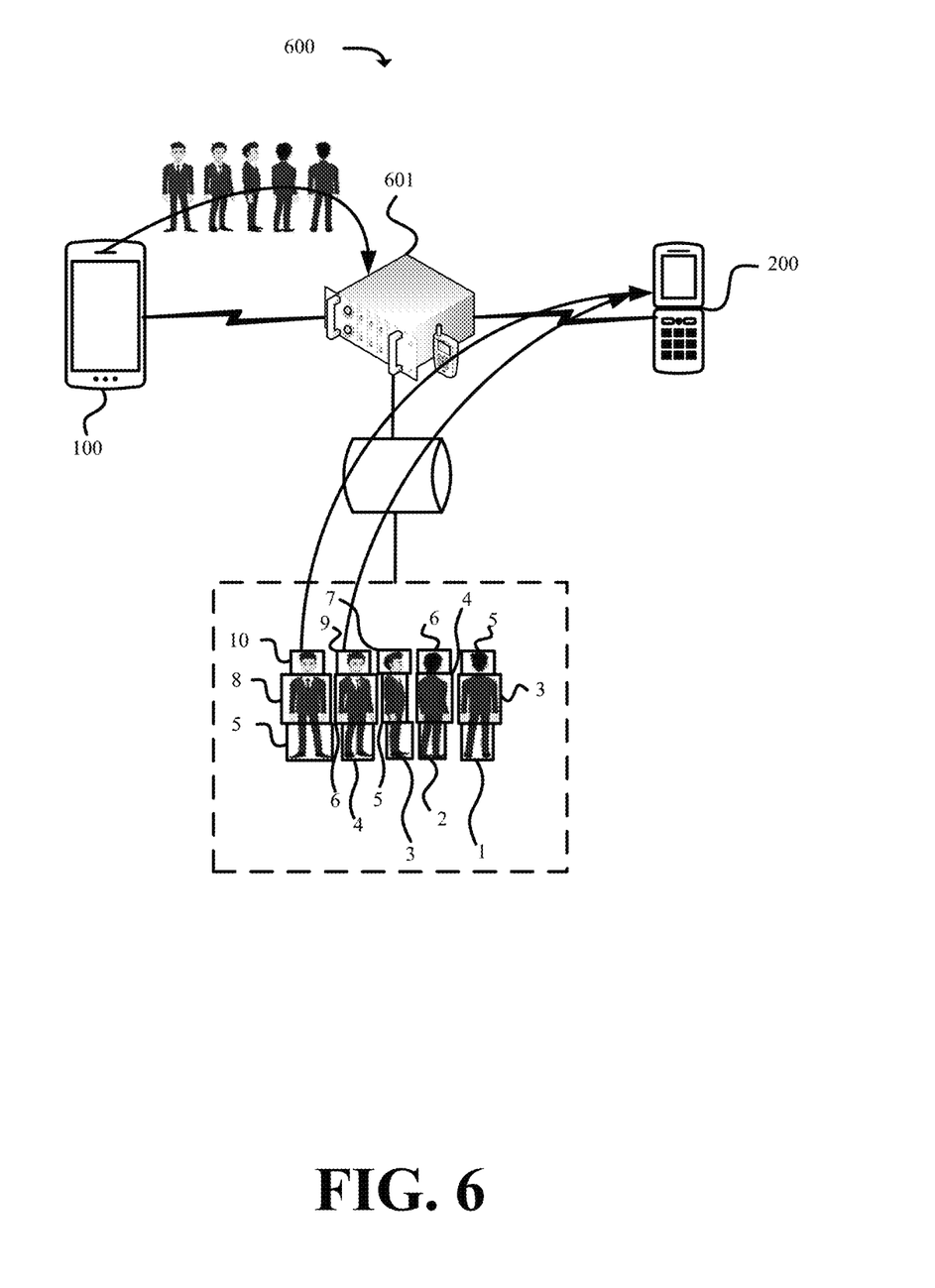
FIG. 6 illustrates example architecture for streaming image data from a sending device to a recipient device in accordance with some embodiments presented herein.

FIG. 6 illustrates example architecture 600 for streaming image data from a sending device to a recipient device in accordance with some embodiments presented herein. Example architecture 600 include sending device 100, recipient device 200, and streaming device 601.

Streaming device 601 may be part of a telecommunications network, and may be used to stream image data from sending device 100 to recipient device 200 when the image data exceeds a size threshold, is from a 3D image, and/or is sent as part of a text message, instant message, chat message, or other real-time messaging service or protocol.

In some embodiments, streaming device 601 includes a distributed set of devices with one or more hardware processors and/or other compute resources to perform the element prioritization and streaming on behalf of sending device 100. For instance, sending device 100 may be a handheld device with limited compute resources relative to streaming device 601. Accordingly, when sending device 100 captures, generates, or receives a 3D image or other large image that exceeds the size threshold, sending device 100 backs up or automatically uploads the image to streaming device 601.

After uploading the image to streaming device 601, sending device 100 issues a request to send the image to recipient device 200. Streaming device 601 receives the request, determines that the image size exceeds the size threshold, and performs the prioritized streaming of the image to the recipient device 200 on behalf of sending device 100. For instance, streaming device 601 differentiates and prioritizes the elements within the image, and performs an out-of-order streaming of the elements based on the determined priorities.

In this manner, sending device 100 uploads the image once to streaming device 601, and streaming device 601 streams the image to different recipient devices 200 without sending device 100 having to resend or reupload the image to streaming device 601 or each recipient device 200. Moreover, the processing overhead associated with differentiating and prioritizing the elements in the image is offloaded from sending device 100 to streaming device 601 which may have considerable more compute resources than sending device 100.

Figure 7:
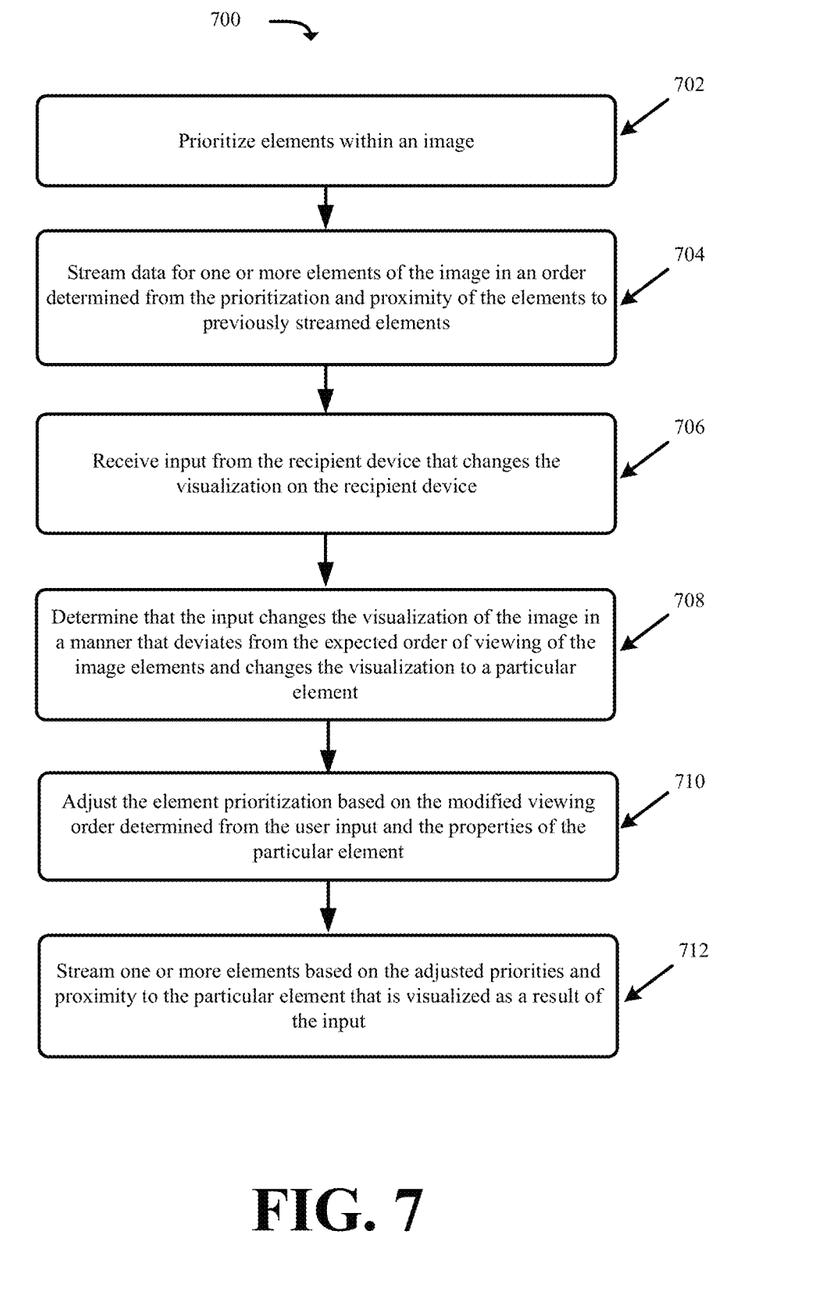
FIG. 7 presents a process for customizing the streaming of image data based on recipient device inputs provided during the streaming in accordance with some embodiments presented herein.

In some embodiments, sending device 100 and/or streaming device 601 may adjust the priorities of the differentiated elements in response to inputs received from the recipient device 200 during streaming of image data. FIG. 7 presents a process 700 for customizing the streaming of image data based on recipient device inputs provided during the streaming in accordance with some embodiments presented herein. Process 700 is implemented by one of sending device 100 or streaming device 601 that provides a prioritized streaming of 3D image elements to recipient device 200

Process 700 includes prioritizing (at 702) elements within an image, and streaming (at 704) data for one or more elements of the image to recipient device 200 in an order determined from the prioritization (at 702) and proximity of the elements to previously streamed elements. Consequently, recipient device 200 receives the data points, meshes, polygons, pixels, and/or other primitives associated with each streamed element, and renders an expanding visualization of the image starting from a first streamed element without waiting for all elements or all data of the image to be streamed.

Process 700 includes receiving (at 706) input from recipient device 200 that changes the visualization on the recipient device 200. For instance, the viewer provides input to change from the visualization of a first streamed element to another element, to another position in the image, or to another perspective of the first streamed element.

Process 700 includes determining (at 708) that the input changes the visualization of the image in a manner that deviates from the expected order of viewing of the image elements and changes the visualization to a particular element. Specifically, the input may transition the visualization from the first streamed element to a third streamed element rather than to a second streamed element that was streamed before the third streamed element because of a greater priority associated with the second streamed element than with the third streamed element.

Process 700 includes adjusting (at 710) the element prioritization based on the modified viewing order determined from the user input and the properties of the particular element. For instance, the viewer may unexpectedly transition the visualization from a foreground element to a background element. Rather than continue prioritizing and streaming the foreground elements, sending device 100 or streaming device 601 adjusts (at 710) the priorities associated with the elements to prioritize streaming the background elements over the foreground elements.

Process 700 includes streaming (at 712) one or more elements based on the adjusted (at 712) priorities and proximity to the particular element that is visualized as a result of the input. Accordingly, the streaming of data for different elements of the image may be adjusted when the viewer viewing behavior deviates from an expected viewing behavior and/or prioritization of the elements.

In some embodiments, sending device 100 and/or streaming device 601 adjusts the differentiated element priorities per recipient based different viewing preferences or viewing behaviors associated with different recipient devices 200. In other words, the prioritization of elements may be customized for different recipient devices 200 based on previously tracked viewing behavior for those recipient devices 200 before the elements are streamed to those recipient devices 200 so that sending device 100 and/or streaming device 601 performs fewer adjustments in response to user input. Accordingly, sending device 100 and/or streaming device 601 may stream different elements from the same image in different orders to different recipient devices 200.

Figure 8:
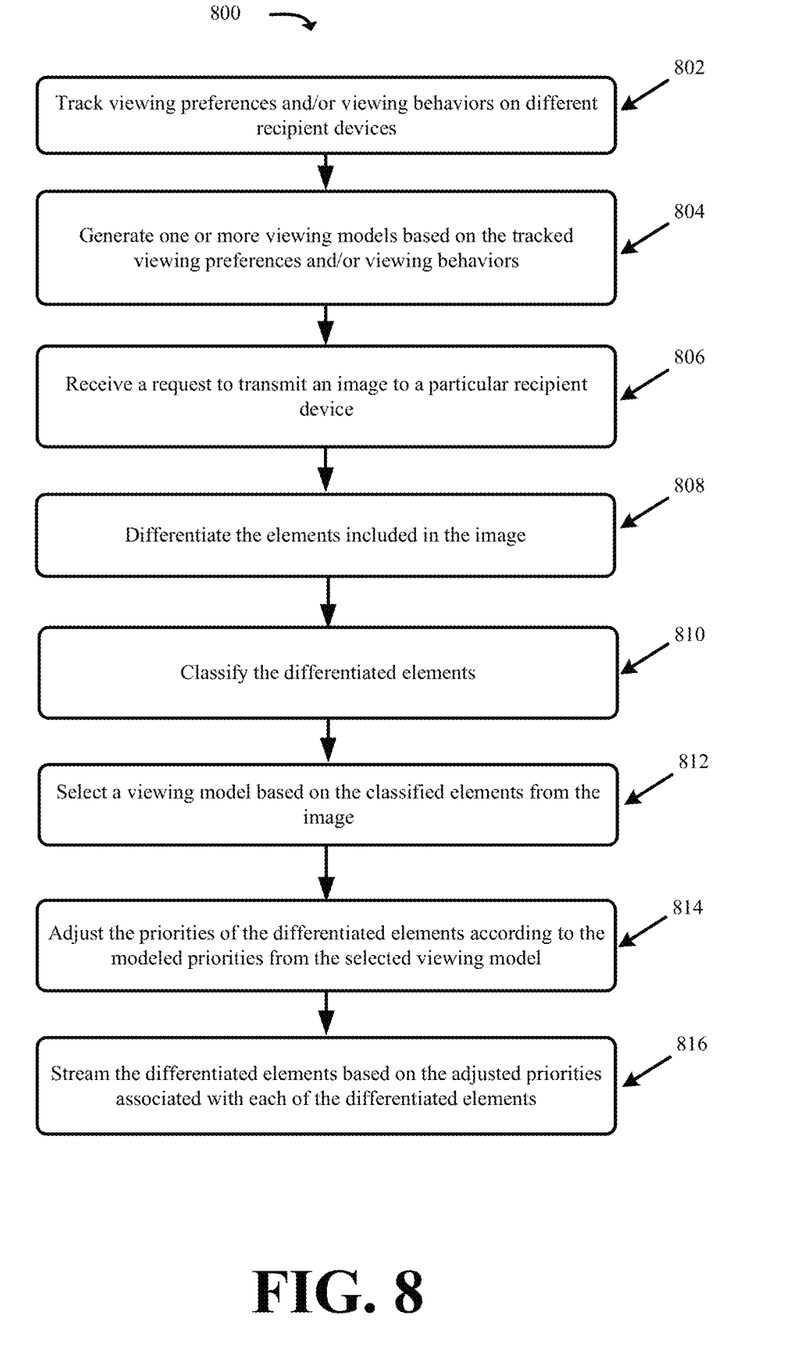
FIG. 8 presents a process for customizing the streaming of image elements based on modeled viewing behaviors associated with different recipient devices in accordance with some embodiments presented herein.

FIG. 8 presents a process 800 for customizing the streaming of image elements based on modeled viewing behaviors associated with different recipient devices 200 in accordance with some embodiments presented herein. Process 800 is implemented by sending device 100 and/or streaming device 601.

Process 800 includes tracking (at 802) viewing preferences and/or viewing behaviors on different recipient devices 200. Tracking (at 802) the viewing preferences includes monitoring the different amounts of time that different viewers associated with recipient devices 200 spend viewing different elements within different images from different perspectives. In some embodiments, a tracker is associated with the images that are streamed to recipient devices 200. The tracker runs in the background while an image is presented on a recipient device. The tracker identifies which elements of a received image are zoomed in on and for how long, which elements are centered in an image and for how long, and/or uses cameras and/or other sensors of a recipient device 200 to track which elements the viewer focuses on or spends the most time viewing.

Process 800 includes generating (at 804) one or more viewing models based on the tracked viewing preferences and/or viewing behaviors. In some embodiments, streaming device 601 generates (at 804) the one or more viewing models for each recipient device 200 based on the viewing behaviors tracked from that specific recipient device 200. In some other embodiments, streaming device 601 aggregates the viewing preferences and/or viewing behaviors from different recipient devices 200, and generates (at 804) the one or more viewing models based on the aggerated viewing preferences and/or viewing behaviors.

In some embodiments, streaming device 601 generates (at 804) a separate viewing model for images involving different elements. For instance, a first viewing model may be generated for images involving people, and a second viewing model may be generated for images involving cars.

In some embodiments, one or more AI/ML techniques may be used to determine patterns or common viewing behaviors across different images involving the same or similar elements, and to define the viewing models based on the determined patterns or common viewing behaviors. For instance, the AI/ML techniques analyze the viewing behaviors tracked for a specific recipient device 200 with respect to different family portraits, determine that the viewer associated with the specific recipient device 200 spends the most time viewing grandchildren, then their children, then in-law family members, then their own siblings, and generates (at 804) a viewing model that prioritizes the elements representing the grandchildren over elements representing other family members. Similarly, the AI/ML techniques may analyze the viewing behaviors associated with different recipient devices 200, and may generate (at 804) a viewing model that prioritizes elements representing young children or babies over adults based on commonality detected in the viewing behaviors associated with different recipient devices 200. Alternatively, the AI/ML techniques may analyze the viewing behaviors associated with a particular recipient device 200 in order to determine that the viewer has a preference for sports cars, and therefore generates (at 804) a viewing model that prioritizes elements representing sports cars over elements representing other vehicles or objects. The viewing models may be stored by streaming device 601, or may be distributed to sending devices 100.

Process 800 includes receiving (at 806) a request to transmit an image to a particular recipient device 200. For instance, a user of sending device 100 creates a text message to send to the particular recipient device 200, and adds or attaches the image to the text message. The request may include an identifier that identifies the particular recipient device 200. In some embodiments, the identifier corresponds to a telephone number, email address, messaging handle, and/or other value that is associated with the intended recipient or the particular recipient device 200.

Process 800 includes differentiating (at 808) the elements included in the image. The elements represent different parts of the image or different perspectives of the objects or scene represented by the image.

Process 800 includes classifying (at 810) the differentiated elements. Classifying (at 810) the differentiated elements includes determining the primary subject matter of the image and/or an identification of the objects or elements captured in the image. For instance, streaming device 601 classifies (at 808) the elements in the image to determine that the image is a portrait of one or more persons, represents a landscape, and/or includes other classified objects or classified subject matter.

Process 800 includes selecting (at 812) a viewing model based on the classified elements from the image. Streaming device 601 selects (at 812) the viewing model that is generated based on the tracked viewing preferences and/or viewing behaviors for the same or similar elements as the differentiated (at 808) and/or classified (at 810) elements of the image. For instance, if the differentiated elements of the requested image involve people or portraits, then streaming device 601 selects (at 812) a viewing model that is generated from the viewing behavior that is tracked during the presentation of other images involving people or portraits, whereas if the differentiate elements of the requested image involve vacation or travel photographs, then streaming device 601 selects (at 812) a viewing model that is generated from the viewing behavior that is tracked during the presentation of different vacation or travel photographs.

Process 800 include adjusting (at 814) the priorities of the differentiated elements according to the modeled priorities from the selected (at 812) viewing model. In some embodiments, streaming device 601 associates a first set of priorities to the differentiated elements based on a differentiation between foreground and background elements, central and peripheral elements, in-focus and out-of-focus elements, and/or general criteria. In some such embodiments, streaming device 601 adjusts (at 814) the first set of priorities based on the priorities from the selected (at 812) viewing model that tracks viewing preferences and/or viewing behaviors for the same or similar differentiated elements from other images.

Process 800 includes streaming (at 816) the differentiated elements based on the adjusted (at 814) priorities associated with each of the differentiated elements. Streaming device 601 may stream (at 816) the differentiated elements in a different order to different recipient devices 200 when different viewing models that track the different viewing preferences and/or viewing behaviors of the different recipient devices 200 are used in adjusting (at 814) the priorities of the differentiated elements for streaming to the different recipient devices 200.

In some embodiments, process 800 may further include adjusting the element priorities and/or streaming (at 816) based on input received from each recipient device 200 that changes the expected viewing order of the streamed elements. The input tracks changes to the elements of the image that are presented on each recipient device 200, and if the viewing order deviates from the expected viewing order, streaming device 601 may adjust the order with which the differentiated elements are streamed to that recipient device 200 to better match the viewing order.

Figure 9:
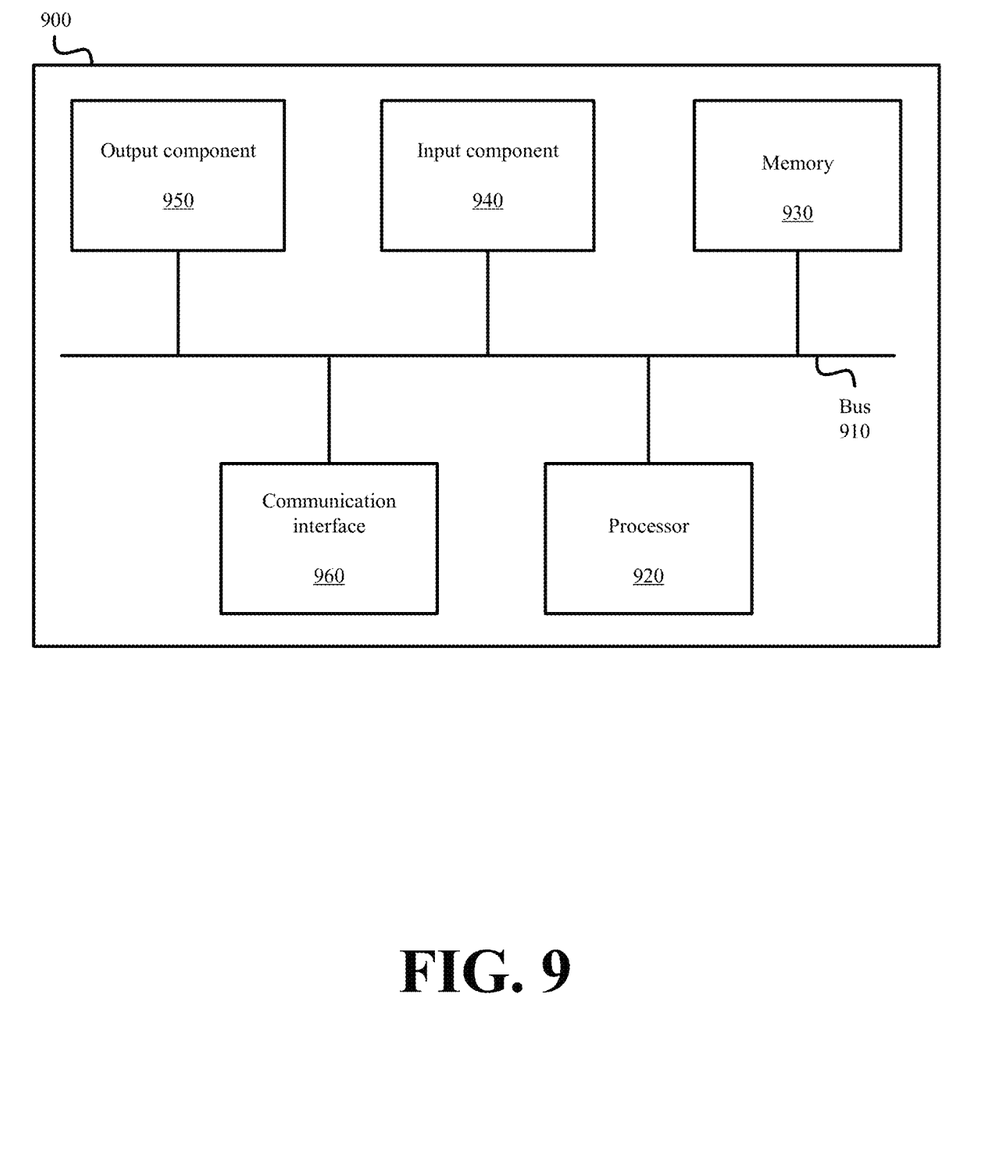
FIG. 9 illustrates example components of one or more devices, according to one or more embodiments described herein.

FIG. 9 is a diagram of example components of device 900. Device 900 may be used to implement one or more of the devices or systems described above (e.g., sending device 100, recipient device 200, streaming device 601, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a request to transmit a three-dimensional ("3D") image to a recipient device, the 3D image comprising a plurality of elements from a plurality of different perspectives;
differentiating each element of the plurality of elements based on different objects detected in the 3D image, wherein each element of the plurality of elements corresponds to a different object in the 3D image;
prioritizing each element of the plurality of elements based on a predicted viewing order, wherein prioritizing each element comprises:
performing a first prioritization based on a position of each element of the plurality of elements in the 3D image; and
performing a second prioritization based on an importance associated with each perspective of the plurality of different perspectives for each element of the plurality of elements;
selecting a particular perspective from the plurality of different perspectives of a particular element from the plurality of elements based on the first prioritization and the second prioritization associating a priority to the particular perspective of the particular element that is greater than a priority associated with other elements of the plurality of elements or other perspectives from the plurality of different perspectives;
streaming the particular element from the particular perspective to the recipient device at a first time;
determining a next element from the plurality of elements to stream from one of the plurality of perspectives after streaming the particular element from the particular perspective based on the next element being positioned adjacent to the particular element and the next element having a priority that is greater than other elements that are positioned adjacent to the particular element; and
streaming the next element to the recipient device at a later second time.

2. The method of claim 1, wherein determining the next element comprises:
selecting a second element from a second perspective that is different than the particular perspective based on the second element from the second perspective being associated with a priority that is greater than a priority of other elements from the plurality of elements that are adjacent to the particular element and other perspectives from the plurality of perspectives of the second element.

3. The method of claim 1, wherein determining the next element comprises:
selecting a second element from the plurality of elements that is different than the particular element and that is represented from the particular perspective.

4. The method of claim 1, wherein streaming the particular perspective of the particular element comprises:
transmitting a set of data from a plurality of data that is encoded for the 3D image, wherein the set of data comprises a byte range between a first byte and a last byte of the plurality of data that does not include the first byte or the last byte.

5. The method of claim 1,
wherein selecting the particular perspective of the particular element comprises obtaining a first view of a scene represented by the 3D image from the particular perspective; and
wherein determining the next element comprises obtaining a different second view of the scene represented by the 3D image from a different second perspective of the plurality of different perspectives.

6. The method of claim 1, wherein determining the next element comprises:
selecting the next element over a second element of the plurality of elements that has a higher priority than the next element in response to the second element being positioned away from the particular element and the next element being positioned adjacent to the particular element.

7. The method of claim 1, wherein prioritizing each element further comprises:
assigning different priorities to the plurality of elements in response to differentiating one or more of a foreground element from a background element, an in-focus element from an out-of-focus element, and an element at a center of the 3D image from an element at a periphery of the 3D image.

8. The method of claim 1 further comprising:
receiving input from the recipient device indicating a viewing order from the particular element that deviates from the predicted viewing order; and
adjusting a priority associated with the plurality of elements in response to the viewing order from the particular element on the recipient device deviating from the predicted viewing order.

9. The method of claim 1 further comprising:
tracking one or more orders with which elements related to the plurality of elements are viewed from the plurality of different perspectives in other 3D images; and
defining the predicted viewing order in response to said tracking.

10. The method of claim 1 further comprising:
tracking viewing preferences on the recipient device as different elements from the plurality of elements in other images are presented on the recipient device; and
wherein prioritizing each element further comprises setting a priority of each element based on the viewing preferences tracked on the recipient device.

11. The method of claim 1, wherein streaming the particular element from the particular perspective comprises:
determining one of a set of data points, meshes, polygons, or primitives that form the particular element from the particular perspective in the 3D image; and
providing the set of data points, meshes, polygons, or primitives to the recipient device at the first time.

12. The method of claim 1 further comprising:
tracking a preference for viewing elements from the particular perspective over other perspectives on at least the recipient device; and
modeling the predicted viewing order to prioritize the particular perspective over the other perspectives based on said tracking.

13. The method of claim 1 further comprising:
tracking a greater amount of time spent viewing the particular element than other elements of the plurality of elements on at least the recipient device; and
modeling the predicted viewing order to prioritize the particular element over the other elements based on said tracking.

14. The method of claim 1, wherein the request comprises the 3D image attached to one or more of a text message, an instant message, a chat message, or a real-time communication message.

15. The method of claim 1, wherein prioritizing each element further comprises:
performing a third prioritization based on non-positional values of each element of the plurality of elements, wherein performing the third prioritization comprises increasing a priority of an element based on a number of colors, color variation, or an amount of detail defined by the non-positional values of the element.

16. A device comprising:
one or more hardware processors configured to:
receive a request to transmit a three-dimensional ("3D") image to a recipient device, the 3D image comprising a plurality of elements that are viewable from a plurality of different perspectives;
differentiate each element of the plurality of elements based on different objects detected in the 3D image, wherein each element of the plurality of elements corresponds to a different object in the 3D image;
prioritize each element of the plurality of elements based on a predicted viewing order, wherein prioritizing each element comprises:
performing a first prioritization based on a position of each element of the plurality of elements in the 3D image; and
performing a second prioritization based on an importance associated with each perspective of the plurality of different perspectives for each element of the plurality of elements;
select a particular perspective from the plurality of different perspectives of a particular element from the plurality of elements based on the first prioritization and the second prioritization associating a priority to the particular perspective of the particular element that is greater than a priority associated with other elements of the plurality of elements or other perspectives from the plurality of different perspectives;
stream the particular element from the particular perspective to the recipient device at a first time;
determine a next element from the plurality of elements to stream from one of the plurality of perspectives after streaming the particular element from the particular perspective based on the next element being positioned adjacent to the particular element and the next element having a priority that is greater than other elements that are positioned adjacent to the particular element; and
stream the next element to the recipient device at a later second time.

17. The device of claim 16, wherein the one or more hardware processors are further configured to:
receive input from the recipient device indicating a viewing order from the particular element that deviates from the predicted viewing order; and
adjust a priority associated with the plurality of elements in response to the viewing order from the particular element on the recipient device deviating from the predicted viewing order.

18. The device of claim 16, wherein the one or more hardware processors are further configured to:
track one or more orders with which elements related to the plurality of elements are viewed from the plurality of different perspectives in other 3D images; and
define the predicted viewing order in response to said tracking.

19. The device of claim 16, wherein the one or more hardware processors are further configured to:
track viewing preferences on the recipient device as different elements from the plurality of elements in other images are presented on the recipient device; and
wherein prioritizing each element further comprises setting a priority of each element based on the viewing preferences tracked on the recipient device.

20. A non-transitory computer-readable medium storing program instructions that, when executed by one or more hardware processors of a streaming device, cause the streaming device to perform operations comprising:
receive a request to transmit a three-dimensional ("3D") image to a recipient device, the 3D image comprising a plurality of elements that are viewable from a plurality of different perspectives;
differentiate each element of the plurality of elements based on different objects detected in the 3D image, wherein each element of the plurality of elements corresponds to a different object in the 3D image;
prioritize each element of the plurality of the elements based on a predicted viewing order, wherein prioritizing each element comprises:
performing a first prioritization based on a position of each element of the plurality of elements in the 3D image; and
performing a second prioritization based on an importance associated with each perspective of the plurality of different perspectives for each element of the plurality of elements;
select a particular perspective from the plurality of different perspectives of a particular element from the plurality of elements based on the first prioritization and the second prioritization associating a priority to the particular perspective of the particular element that is greater than a priority associated with other elements of the plurality of elements or other perspectives from the plurality of different perspectives;
stream the particular element from the particular perspective to the recipient device at a first time;
determine a next element from the plurality of elements to stream from one of the plurality of perspectives after streaming the particular element from the particular perspective based on the next element being positioned adjacent to the particular element and the next element having a priority that is greater than other elements that are positioned adjacent to the particular element; and
stream the next element to the recipient device at a later second time.

* * * * *